Patented Feb. 25, 1930

1,748,450

UNITED STATES PATENT OFFICE

WOLFGANG JOB, OF BERLIN-DAHLEM, GERMANY, ASSIGNOR TO AMERICAN LURGI CORPORATION, OF NEW YORK, N. Y., A CORPORATION OF NEW YORK

PROCESS OF SMELTING ORE AND OTHER ZINC-CONTAINING MATERIALS

No Drawing. Application filed June 28, 1926, Serial No. 119,218, and in Germany July 2, 1925.

This invention relates to the recovery of zinc as zinc oxide from ores or like materials rich in zinc and/or containing additional valuable constituents such as lead, copper or noble metals, and in particular relates to smelting processes such as are carried out in shaft furnaces.

Heretofore these shaft furnace de-zincing processes have been limited to the treatment of those materials from which it was deemed unprofitable to attempt to recover metallic zinc in muffle furnaces. These old shaft furnace processes were applied to relatively poor materials with an approximate content of 15 to 30% of volatile metals, and especially to mixed ores containing lead and zinc, but not containing copper and noble metals.

According to this invention, materials rich in zinc which today are normally worked up by the zinc smelters in muffle distillation furnaces, especially if they contain lead, copper and noble metals, may be smelted with high yields in shaft furnaces, since copper and noble metals can be recovered as matte, while the ashes resulting from the muffle process even though they contain these metals, are of little value.

The present invention makes it possible to smelt the above-named mixed ores to great advantage in shaft furnaces, and is especially applicable to rich zinc ores, as for example those containing a high percentage of blende and calamine.

According to this invention, two successive smelting operations are used.

In the first, the materials, which may have been previously roasted, are mixed with reducing material, and if necessary, with fluxes, and smelted in a shaft furnace.

This first smelting operation is so controlled as to produce the following results:

(1) The operation is carried out at a temperature sufficient to volatilize the lead, cadmium and other volatile metals, together with a relatively small amount of zinc. The resulting oxides are recovered as a lead-zinc pigment.

(2) The copper and noble metals are recovered in the form of a molten matte, sulfur-containing materials being added to the charge, if necessary.

(3) A slag is produced containing the major portion of the zinc in the charge.

This zinc-containing slag from which the lead and other volatilizable materials have been nearly completely removed, forms a particularly advantageous starting material for the second stage of the process, in which these slags mixed with suitable reducing material and additional fluxes, if necessary, are again smelted at a temperature sufficient to completely volatilize all the zinc as zinc oxide, which is condensed and recovered in the usual way. This zinc oxide is of the highest grade, such as that obtained by what is known as the French process.

It is possible to regulate within wide limits the amount of zinc volatilized in the first shaft furnace, so that there is no difficulty in carrying out the de-zincing methods economically, since the relative amounts of lead-zinc pigment and pure zinc oxide can be controlled according to market conditions.

It has been found that this double method of operation is considerably cheaper than the smelting of the same materials in muffle furnaces for the production of metallic zinc, since the cost per ton of ore in spite of the two meltings is only about two-thirds of that of the muffle furnace process. There results also an advantage in the recovery and ready utilization of the additional ingredients of the ore such as lead, copper and the noble metals.

I claim:

Process for obtaining high grade zinc oxide from ores and other materials containing zinc together with lead, copper or noble metals in two operations which comprises first smelting the ore with fuel and the necessary additions in a shaft furnace in continuous operation under such conditions that all of the components more easily volatilized than zinc are volatilized, the copper and noble metals are recovered in the form of a molten matte, and a slag rich in zinc is produced; and thereafter treating the said slag in a shaft furnace to recover by volatilization a high-grade zinc oxide pigment.

In testimony whereof, I affix my signature.

WOLFGANG JOB.